(12) United States Patent
Suzuki et al.

(10) Patent No.: US 10,105,806 B2
(45) Date of Patent: Oct. 23, 2018

(54) CHIP CONVEYOR

(71) Applicant: FUJI CORPORATION, Chiryu-shi (JP)

(72) Inventors: Toshifumi Suzuki, Toyota (JP); Koji Yamazaki, Anjo (JP)

(73) Assignee: FUJI CORPORATION, Chiryu (JP)

( * ) Notice: Subject to any disclaimer, the term of this patent is extended or adjusted under 35 U.S.C. 154(b) by 0 days.

(21) Appl. No.: 15/554,011

(22) PCT Filed: Mar. 3, 2015

(86) PCT No.: PCT/JP2015/056163
§ 371 (c)(1),
(2) Date: Aug. 28, 2017

(87) PCT Pub. No.: WO2016/139743
PCT Pub. Date: Sep. 9, 2016

(65) Prior Publication Data
US 2018/0065223 A1 Mar. 8, 2018

(51) Int. Cl.
*B65G 17/34* (2006.01)
*B23Q 11/00* (2006.01)
(Continued)

(52) U.S. Cl.
CPC ...... *B23Q 11/0057* (2013.01); *B23Q 11/0067* (2013.01); *B65G 17/34* (2013.01); *B65G 19/205* (2013.01)

(58) Field of Classification Search
CPC . B23Q 11/00; B23Q 11/0067; B23Q 11/0057; B01D 36/02; B01D 36/04;
(Continued)

(56) References Cited

U.S. PATENT DOCUMENTS 5,167,839 A * 12/1992 Widmer, II ........ B01D 21/2455
198/716
5,992,642 A * 11/1999 Ota ........................ B01D 33/04
210/394
(Continued)

FOREIGN PATENT DOCUMENTS

JP 62-184951 U 11/1987
JP 9-150342 A 6/1997
(Continued)

OTHER PUBLICATIONS

International Search Report dated May 12, 2015 in PCT/JP2015/056163, filed on Mar. 3, 2015.

*Primary Examiner* — James R Bidwell
(74) *Attorney, Agent, or Firm* — Oblon, McClelland, Maier & Neustadt, L.L.P.

(57) ABSTRACT

A chip conveyor, which reduces the discharge amount of a cutting liquid by a simple structure, includes a storage tank in which chips and cutting liquid are stored; an endless conveyor main body which connects both end portions of a number of hinge plates in a front-back direction to each other by a hinge and circularly moves through a climbing portion from an inside of the storage tank by a driving mechanism; and a control device which controls driving of the driving mechanism, in which, in the conveyor main body, multiple scraping plates formed in a standing state with respect to the hinge plate are disposed with an interval in an advancing direction, and in which the scraping plates are formed along a width direction of the conveyor main body and have one or more through portions through which the cutting liquid passes within the width interval thereof.

6 Claims, 7 Drawing Sheets

(51) Int. Cl.
*B65G 19/20* (2006.01)
*B65G 19/24* (2006.01)

(58) Field of Classification Search
CPC ........ B65G 19/14; B65G 19/24; B65G 19/12;
B65G 19/22; B65G 17/34; B65G 19/205
USPC .................................................. 198/717–734
See application file for complete search history.

(56) References Cited

U.S. PATENT DOCUMENTS

| | | | |
|---|---|---|---|
| 7,000,758 B2* | 2/2006 | Bjorklund | B65G 15/08 |
| | | | 198/716 |
| 9,517,886 B2* | 12/2016 | Petersen | B65G 15/42 |
| 2016/0114981 A1* | 4/2016 | Matsuyama | B65G 19/10 |
| | | | 198/728 |

FOREIGN PATENT DOCUMENTS

| | | |
|---|---|---|
| JP | 11-254265 A | 9/1999 |
| JP | 2002-036060 A | 2/2002 |
| JP | 2003-145390 A | 5/2003 |
| WO | 03/041908 A1 | 5/2003 |

* cited by examiner

//  CHIP CONVEYOR

TECHNICAL FIELD

The present application relates to a chip conveyor including a configuration for reducing a discharge amount of cutting liquid discharged together with chips.

BACKGROUND ART

In a machine tool such as a lathe, since chips are generated in accordance with processing, a chip conveyor for discharging the chips from the processing section to outside of the machine tool is provided. In the chip conveyor, a chip receiver and a storage tank are disposed under the processing section where chips and cutting liquid fall and an endless hinge belt which inclines and extends upward from the tank is configured to circularly move. Therefore, chips falling from the chip receiver into the storage tank are discharged by the chip conveyor being periodically driven. At that time, the chips are conveyed while rising from the storage tank through a climbing portion, fall from a rising portion to a collection box and are collected. Among such chip conveyors, scraping plates are provided at predetermined intervals with respect to the hinge belt so that chips can be efficiently conveyed.

The chip conveyor of the machine tool has a problem of discharging the cutting liquid attached to the chips together with the chips to the collection box. In other words, the cutting liquid, which is supposed to be filtered and used repeatedly, is discharged as the chip is collected and thus the amount of the cutting liquid gradually decreases. This problem particularly noticeable on a chip conveyor having the scraping plate. Therefore, in the following PTL 1, there is provided a configuration in which chip collection is performed via a horizontal section provided at an upper end portion, and cutting liquid falls from an interval of the hinge plate so as to be collected through a gutter. In addition, in the following PTL 2, a shooter including a perforated plate and a barrier board is provided in addition to the chip conveyor, and a gutter for collecting the cutting liquid falling through holes of the perforated plate is provided.

CITATION LIST

Patent literature

PTL 1: JP-A-2002-036060
PTL 2: JP-A-09-150342

SUMMARY

Technical Problem

The chip conveyor of the related art is provided with various structures for collecting a cutting liquid. However, as illustrated in the examples of PTL 1 and PTL 2, in the chip conveyor of the related art, since a structure for collecting the cutting liquid is large, a wide installation space thereof is required and the cost thereof is increased. For example, in the chip conveyor disclosed in the PTL 1, a horizontal section for horizontally moving the chips which rise and are conveyed without falling is provided on a rear side of the machine tool, and furthermore, a gutter and a liquid collection tank for collecting the cutting liquid are also configured to be installed. In addition, in PTL 2, a shooter and a gutter are configured to be assembled to the rear side of the machine tool.

An object of the present disclosure is to provide a chip conveyor which reduces discharge amount of cutting liquid by a simple configuration in order to solve such a problem.

Solution to Problem

A chip conveyor according to one aspect of the present disclosure includes a storage tank in which chips and cutting liquid are stored, an endless conveyor main body which connects both end portions of a number of hinge plates in a front-back direction to each other by a hinge and circularly moves through a climbing portion from an inside of the storage tank by a driving mechanism, and a control device which controls driving of the driving mechanism, in which, in the conveyor main body, multiple scraping plates formed in a standing state with respect to the hinge plate are disposed with an interval in an advancing direction, and in which the scraping plates are formed along a width direction of the conveyor main body and have one or more through portions through which the cutting liquid passes within the width interval thereof.

Advantageous Effects

According to the disclosure, even if the scraping plate is provided on the conveyor main body, since the cutting liquid passes through from the through hole to a rear side in the advancing direction, pumping of a large amount of cutting liquid from the storage tank as in the related art can be avoided. in addition, the cutting liquid remaining on the scraping plate falls through the through hole when moving along the climbing portion and is returned to the storage tank. Therefore, according to the present disclosure, the discharge amount of the cutting liquid can be decreased, and a simple configuration relating to the scraping plate can be achieved.

DESCRIPTION OF EMBODIMENTS

Figure 1:
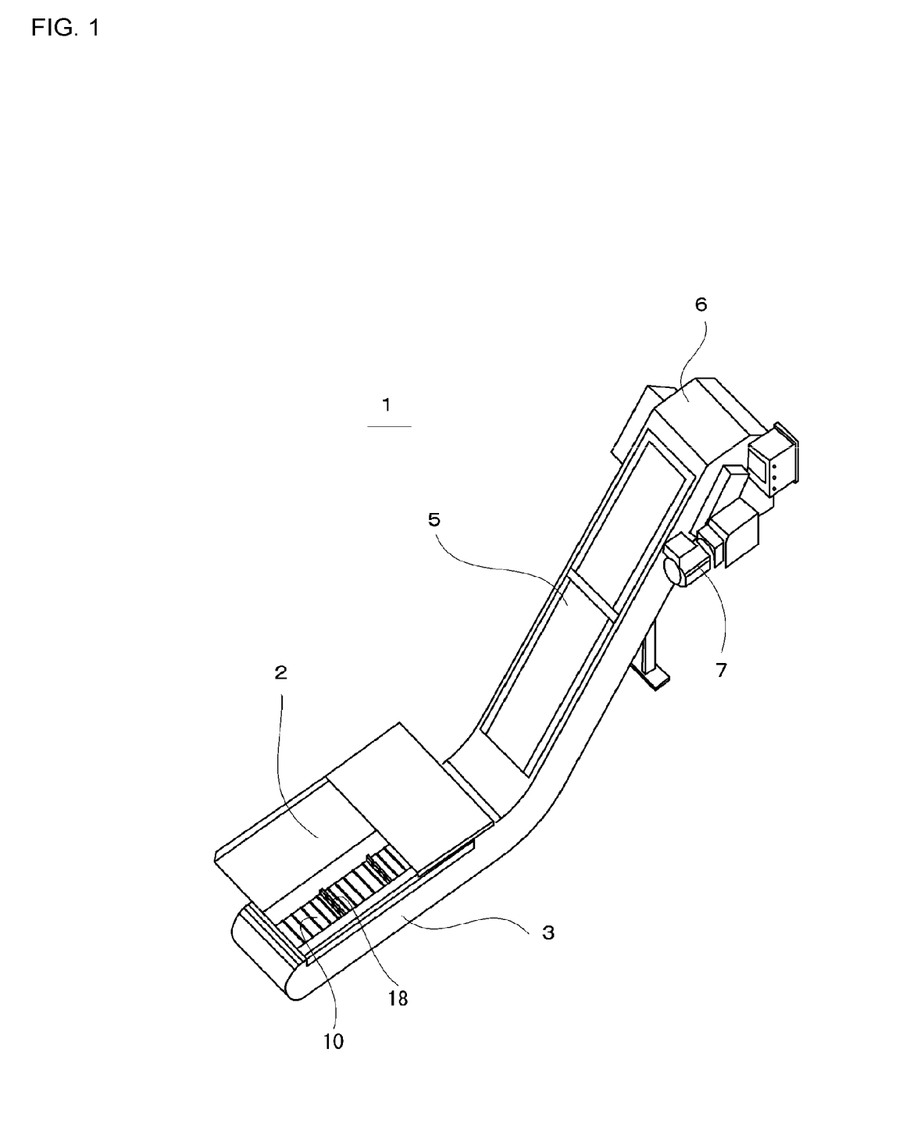
FIG. 1 is a perspective view illustrating a first embodiment of a chip conveyor.
Figure 2:
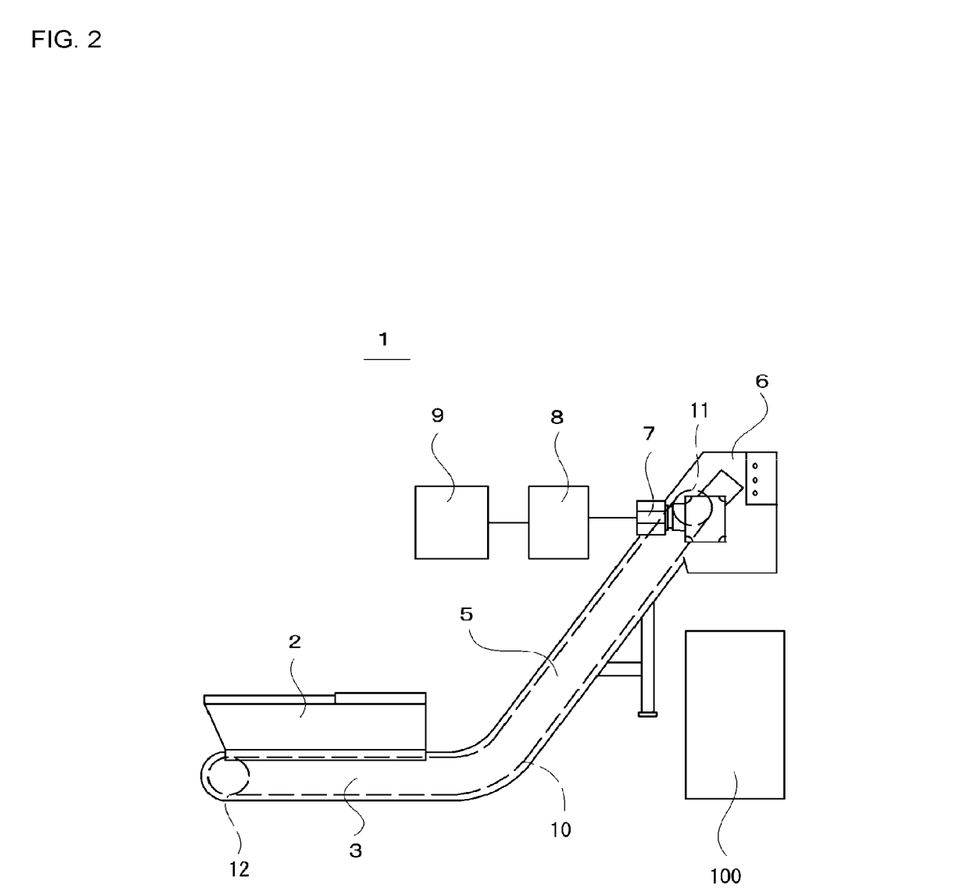
FIG. 2 is a side view schematically illustrating an internal structure of the first embodiment of the chip conveyor.

Hereinafter, an embodiment of a chip conveyor according to the disclosure will be described with reference to the drawings. FIG. 1 is a perspective view illustrating the whole chip conveyor of the first embodiment and FIG. 2 is a side view schematically illustrating an internal structure. Chip conveyor 1 is mounted on a machine tool such as a lathe. For example, in a machine tool, rotation is applied to a workpiece gripped by a main spindle chuck and predetermined cutting processing is performed by a cutting tool mounted on a tool rest. Chip conveyor 1 is incorporated in such a machine tool. Therefore, chip conveyor 1 is provided with chip receiver 2 and storage tank 3 for storing chips and cutting liquid (coolant) positioned below the processing section.

The cutting liquid ejected during processing is temporarily stored in storage tank 3, filtered through a filtration device, and then supplied again to the processing section. On the other hand, the chips accumulated in storage tank 3 are conveyed by driving chip conveyor 1 and put into a collection box. As described in the above problem, a fixed amount of cutting liquid is discharged to the outside along with the discharge of such chips. Therefore, in a case where the total amount of the cutting liquid circulating in the machine tool decreases, it is necessary to newly replenish the cutting liquid, and if the frequency is high, it will hinder other work and also increase the cost. Chip conveyor 1 of the present embodiment reduces the discharged amount of cutting liquid due to chip collection and reduces the number of replenishment and replenishment amount of cutting liquid.

Conveyance duct 5 rising obliquely upward from storage tank 3 is formed in chip conveyor 1. Conveyance duct 5 extends obliquely upward from storage tank 3 toward the rear side of the machine tool and discharge duct 6 is provided at an upper end portion of conveyance duct 5. Discharge duct 6 has a shape bent so as to be continuous to a discharge port which is opened downward from conveyance duct 5. Collection box 100 for collecting the discharged chips is disposed below discharge duct 6. A continuous cavity is formed in an inside portion of storage tank 3, conveyance duct 5, and discharge duct 6 constituting chip conveyor 1 and in the cavity, a conveyor main body to which endless hinge belt 10 is assembled so that the endless hinge belt 10 circularly moves is configured.

In the conveyor main body, a pair of left-right driving sprockets 11 are pivotally supported in an inside portion of discharge duct 6 and a pair of left-right driven sprockets 12 are pivotally supported at an end portion position far from discharge duct 6 in storage tank 3. Endless conveyor chain 13 (see FIG. 3) is placed between driving sprocket 11 and driven sprocket 12 and hinge belt 10 is configured integrally with conveyor chain 13. In driving sprocket 11, driving motor 7 for outputting rotation is installed outside discharge duct 6.

In hinge belt 10, driving sprocket 11 and driven sprocket 12 become turning points and hinge belt 10 circularly moves in an up-down direction. In other words, hinge belt 10 has a forward path and a backward path for moving between overlapping positions when viewed between both sprockets 11 and 12 in an up-down direction, and an upper side thereof is the forward path for discharging and conveying the chips and a lower side thereof is the backward path after discharge of the chips. Although the chips stored in storage tank 3 are discharged and conveyed in a state of being placed on hinge belt 10 by the driving of driving motor 7, in the present embodiment, scraping plate 18 is formed on hinge belts 10 in order to efficiently convey the chips.

Figure 3:
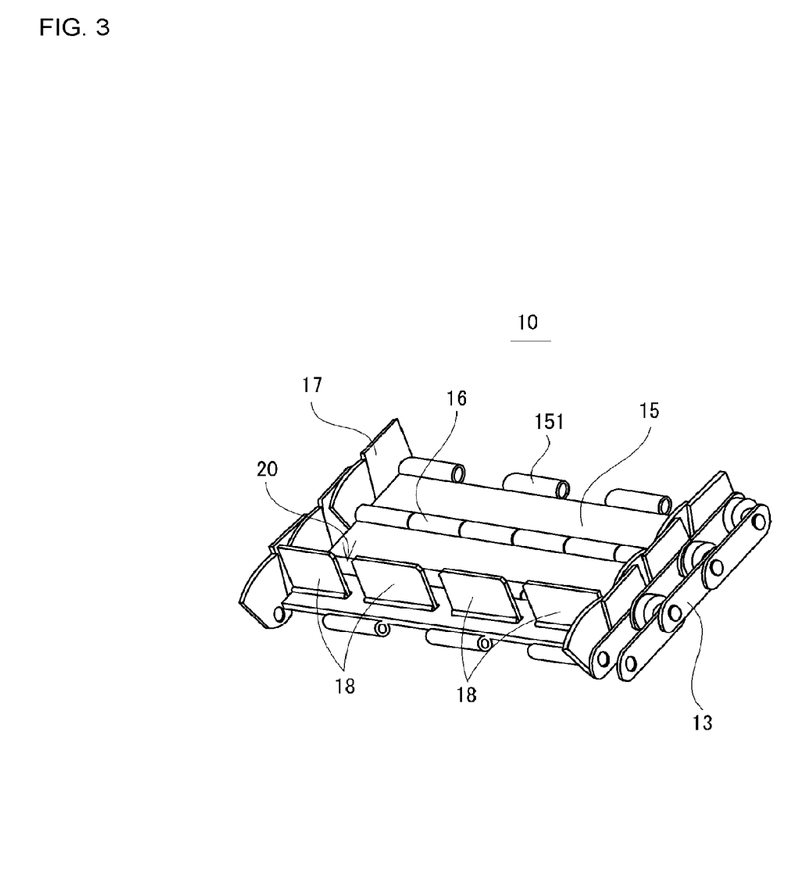
FIG. 3 is a perspective view illustrating a portion of a hinge belt constituting the chip conveyor.

Here, FIG. 3 is a perspective view illustrating a portion of the hinge belt. In hinge belt 10, multiple hinge plates 15 are connected to each other by hinge 16. In other words, a hinge pin is connected to conveyor chain 13, and two hinge plates 15 arranged in a front-back direction are connected by a common hinge pin passing through respective cylinder sections 151. In hinge belt 10, multiple hinge plates 15 connected in this manner are continuous in a circumferential shape. In addition, in hinge belt 10, multiple side plates 17 are disposed at both ends of hinge plate 15 in the left-right width direction so that chips do not fall off from the horizontal side thereof. Conveyor chain 13 is disposed outside side plate 17.

In hinge belt 10 of the present embodiment, scraping plate 18 is integrally formed on a portion of hinge plates 15. Hinge plate 15 is a rectangular plate material, and cylinder section 151 through which a hinge pin passes is formed in a long side portion in a front-back direction. Scraping plate 18 is a rectangular plate member with a portion of corners thereof chamfered and is joined so as to butt against hinge plate 15 in an orthogonal direction. The joined state is parallel to hinge 16 and is orthogonal to the advancing direction of hinge belt 10.

Scraping plate 18 in a standing posture is formed with substantially the same height as that of side plate 17 and is a stopping member which prevents chips from slipping down even in the climbing portion of conveyance duct 5. In hinge belt 10, multiple such scraping plates 18 are provided in the circumferential direction and are disposed at a fixed interval. Therefore, the chips in storage tank 3 are conveyed by the amount sandwiched between the front and rear scraping plates 18. Therefore, for example, when rising the climbing portion in conveyance duct 5, distance between the scraping plates 18 positioned in front-back direction as viewed in the advancing direction of hinge belt 10 is set so that chips in one section distributed by scraping plate 18 do not to fall to the rear side in the advancing direction.

Note that, although the scraping plate of the hinge belt can efficiently convey the chips, the cutting liquid present in the tank is scraped when the chips are discharged. Therefore, in the present embodiment, multiple through portions 20 are formed in the width direction of hinge belt 10 so that the cutting liquid is unlikely to be taken out from storage tank 3 and the cutting liquid is likely to flow down at the climbing portion. Although the scraping plate is conventionally formed in a size matching the width dimension of the hinge belt, in the present embodiment, scraping plate 18 having a small rectangular shape is disposed at a fixed interval in the width direction so that through portion 20 can be formed.

The size and the number of the through portions 20 are not particularly limited and may be designed in consideration of the shape and size of chips or the degree of accumulation condition of cutting liquid by scraping plate 18, and the like. In addition, the shape of through portion 20 is not limited, and does not have to be a slit shape in which scraping plates 18 are separated from each other as illustrated in the drawing, and may be a rectangular or semicircular hole drilled in the joining side of hinge plate 15 with respect to one scraping plate that matches the width dimension of hinge belt 10.

Therefore, in chip conveyor 1 having such a configuration, chips in storage tank 3 are carried out by the revolution of hinge belt 10. At that time, the cutting liquid in storage tank 3 passes through through portion 20 of traveling scraping plate 18. in the climbing portion of conveyance duct 5, the chips are supported by scraping plate 18 and rise as hinge belt 10 circularly moves without slipping off. On the other hand, the cutting liquid flows down through through portion 20 of scraping plate 18. In this way, since through portion 20 is formed on scraping plate 18, the cutting liquid is unlikely to remain on scraping plate 18 when chips are discharged, and in addition, is likely to flow down from scraping plate 18 at the climbing portion.

In the present embodiment, further, it is configured that driving control of chip conveyor 1 is performed so that the cutting liquid is likely to flow down. In chip conveyor 1, rotation is applied to driving sprocket 11 by the output of driving motor 7 and chip conveyor 1 circularly moves so that up and down of the chip conveyor are switched at the turning positions of driving sprocket 11 and driven sprocket 12. As illustrated in FIG. 2, power supply device 8 that supplies drive power is connected to driving motor 7 and control device 9 is connected to power supply device 8. Control device 9 is for controlling the driving of the machine tool such as the driving motor of each driving section such as the main spindle and a cutting liquid supply device, and a conveyor control program of chip conveyor 1 is stored in the control device. In the conveyor control program, for example, processing time information for the workpiece is acquired from the rotation control of the main spindle, from the processing time it is determined that an appropriate amount of chips are accumulated in storage tank 3 and then discharge and conveyance of the chips by chip conveyor 1 are performed by driving driving motor 7.

Figure 4:
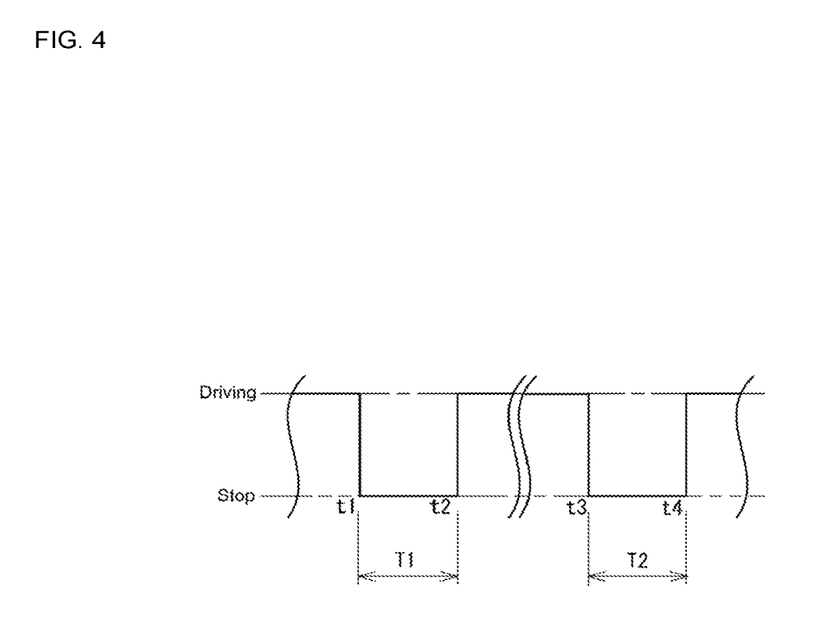
FIG. 4 is a diagram illustrating a time chart of an intermittent operation of the chip conveyor.

The driving of chip conveyor 1 is divided into a standby operation until a predetermined amount of the chips are accumulated in storage tank 3 described above and a conveyance operation for discharging the chips. Then, in the present embodiment, intermittent operation as illustrated in the time chart of FIG. 4 is performed in the conveyance operation. The intermittent operation is an operation performed when chips are conveyed through the climbing portion of conveyance duct 5 and is an operation that stops for a predetermined time T1 and is repeated at a fixed interval. This intermittent operation is an operation of making the time until the chips carried out from storage tank 3 reach discharge duct 6 longer. In other words, although the cutting liquid is attached to the chips carried out from storage tank 3, a large amount of cutting liquid falls from the chips due to the longer conveyance time. In addition, a large number of cutting liquid remaining in scraping plate 18 also flows down from through portion 20. In a case of the present embodiment, for example, the stop time T1 is about several seconds and the quantity of stops until the chips reach discharge duct 6 is several.

Since repeated moving and stopping of hinge belt 10 vibrates the chips during the conveyance, a large amount of the cutting liquid is likely to fall from the chips. Therefore, in the present embodiment, further as illustrated in the time chart of FIG. 5, it is configured so that a disconnection and connection operation is performed multiple times during short time intervals. This disconnection and connection operation is performed, for example, at the termination of the stop time T1 (t2, t4, or the like.) illustrated in FIG. 4. Therefore, when the revolution of hinge belt 10 is resumed, the disconnection and connection operation in which the movement and the stop are repeated several times during the time T2 is performed on chip conveyor 1. Subsequently, the revolution of hinge belt 10 at a fixed speed is continued until the next stop.

Vibration is applied to hinge belt 10 by such a disconnection and connection operation and the cutting liquid remaining attached to the chips is also shaken off. In addition, in the present embodiment, since through portion 20 is formed in scraping plate 18, the cutting liquid accumulated in scraping plate 18 is also caused to flow downward from through portion 20 by vibrations during the disconnection and connection operation. In other words, the cutting liquid scraped out from storage tank 3 and the cutting liquid falling from the chips is accumulated on scraping plate 18. Although such a cutting liquid also flows down from through portion 20 during normal conveyance, still it remains on the scraping plate 18 to some extent. Vibration of the disconnection and connection operation is also intended to make the remaining cutting liquid fall as much as possible. This point is also effective for flowing down the cutting liquid of the portion since the cutting liquid is likely to be accumulated not only on scraping plate 18 but also on rising portion of hinge 16.

Figure 5:
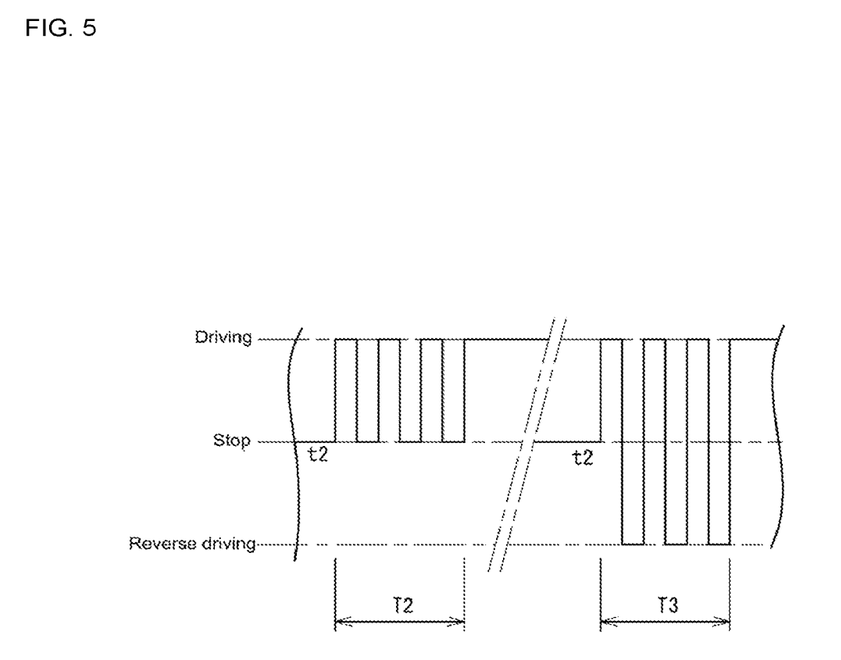
FIG. 5 is a diagram illustrating a time chart of a disconnection and connection operation of the chip conveyor.

The disconnection and connection operation at time T2 illustrated in FIG. 5 is not limited to the time (t2, t4, or the like) of the termination of stop time T1 illustrated in FIG. 4, but may be at the time (t1, t3, or the like) of the start of stop time T or any time during stop time T1 or any time other than stop time T1. In other words, the timing at which more cutting liquid is shaken off from the chip and more cutting liquid flows down from through hole 20 of scraping plate 18 may be selected and as required. Further, as for the disconnection and connection operation, forward movement and backward movement (forward rotation and reverse rotation of driving motor 7) of hinge belt 10 may be repeated as illustrated in the time chart indicated by time T3 in FIG. 5. Implementation timing of the disconnection and connection operation is also the same as the disconnection and connection operation at time T2.

Therefore, according to chip conveyor 1 of the present embodiment, even though scraping plate 18 is provided on hinge belt 10, since the cutting liquid passes through from through hole 20 to the rear side in the advancing direction, pumping out of a large amount of cutting liquid from the storage tank 3 as in the related art can be avoided. In addition, the cutting liquid remaining on scraping plate 18 flows down through through hole 20 when moving in the climbing portion of conveyance duct 5. Thus, in the present embodiment, the cutting liquid is unlikely to remain on scraping plate 18 thanks to through portion 20. Therefore, before scraping plate 18 reaches discharge duct 6, a large amount of cutting liquid flows down and is returned from conveyance duct 5 to storage tank 3, so that the discharge amount of the cutting liquid is reduced as compared with the chip conveyor of the related art and waste can be suppressed. In addition, an effect can be obtained by through portion 20 of scraping plate 18 without a complicated structure.

In addition, in the present embodiment, since the intermittent operation is performed under the control of chip conveyor 1, during the period until the chips arrive at discharge duct 6 and are thrown into collection box 100, a large amount of the cutting liquid attached thereto falls off from chips. The cutting liquid falling from the chips flows down to storage tank 3 through through hole 20 as described above. Further, since the disconnection and connection operation is performed in the control of chip conveyor 1, a large amount of the attached cutting liquid is shaken off by the vibration of hinge belt 10. In addition, by hinge belt 10 vibrating, the cutting liquid accumulated in scraping plate 18 is likely to flow down through through portion 20, and a large amount of cutting liquid is returned to storage tank 3. Therefore, by controlling the intermittent operation and the disconnection and connection operation with respect to chip conveyor 1, the discharged amount of cutting liquid can be reduced as compared with the chip conveyor of the related art and thus waste can be suppressed. In addition, an effect can be obtained by driving control of chip conveyor 1 without being a complicated structure.

Further, the overall configuration of chip conveyor 1 of the present embodiment can also be simplified by achieving the effect using a simple structure such as scraping plate 18 as described above. In other words, the cutting liquid falling from hinge belt 10 during the conveyance flows through conveyance duct 5 and returns to storage tank 3, and the storage section for the cutting liquid is configured from only storage tank 3. For example, in the example of the PTL 1, a tank is provided at a rear portion having a collection box and in the example of PTL 2, a gutter for collecting cutting oil is separately provided on another rear portion. In the present embodiment, the configuration of the entire chip conveyor 1 can be simplified as compared with such an example of the related art described above.

Figure 6:
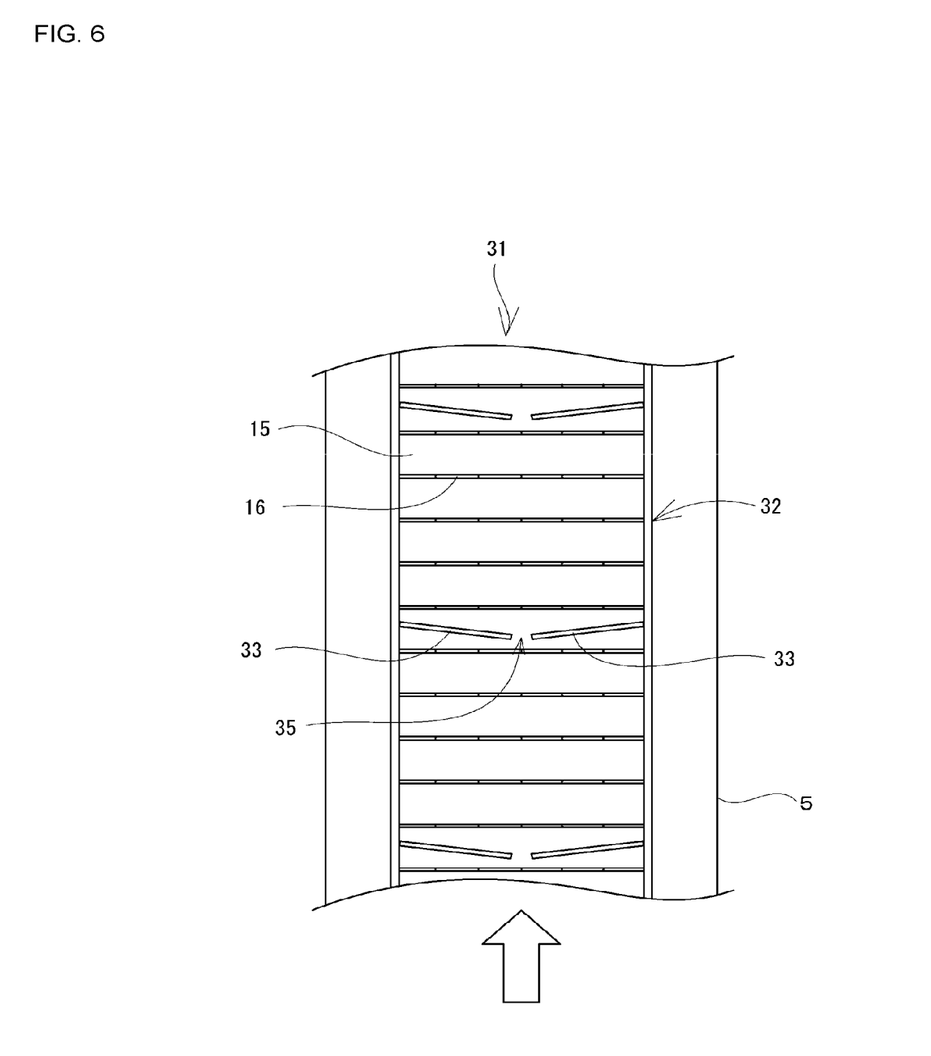
FIG. 6 is a plan view of a second embodiment illustrating a simplified hinge belt in a conveyance duct of the chip conveyor.

Subsequently, a second embodiment of a chip conveyor will be described. FIG. 6 is a plan view illustrating a simplified hinge belt in conveyance duct 5 of the chip conveyor. Chip conveyor 31 of the present embodiment has a common configuration to chip conveyor 1 of the first embodiment except for scraping plate 33 provided on hinge belt 32. Therefore, the same reference numerals will be used to describe the common configurations.

In hinge belt 32, multiple hinge plates 15 are circumferentially connected by hinge 16 and can circularly move by a driving motor, and scraping plate 33 is joined to hinge plate 15 at a fixed interval. In particular, in the present embodiment, a pair of left-right scraping plates 33 are joined to one hinge plate 15. Scraping plate 33 is a rectangular plate material and is joined so as to be orthogonal to hinge plate 15. However, in the present embodiment, scraping plate 33 is inclined from both ends in the left-right direction toward the center to a rear side in the advancing direction. The pair of left-right scraping plates 33 described above are disposed to be spaced apart from each other so that an interval is formed in the center portion and thus a through portion 35 through which the cutting liquid flows down is formed. Scraping plate 33 has an inclined angle at which the chips are supported at the climbing portion and the size of through portion 35 is not particularly limited and is designed in consideration of the shape and size of the chips.

In chip conveyor 31, the chips in storage tank 3 are carried out by circular moving of hinge belt 32. At that time, the cutting liquid in storage tank 3 passes through through portion 35 of the traveling scraping plate 33. At the climbing portion of conveyance duct 5, the chips are supported by scraping plate 33 and rise as hinge belt 10 circularly moves without flowing down. On the other hand, the cutting liquid flows down through through portion 35 without staying at inclined scraping plate 33.

Therefore, according to chip conveyor 31 of the present embodiment, even if scraping plate 33 is provided on hinge belt 32, since the cutting liquid passes through inclined through hole 35 to the rear side in the advancing direction, pumping out of a large amount of cutting liquid from storage tank 3 as in the example of the related art can be avoided. In addition, the cutting liquid remaining at the point of exiting from storage tank 3 flows along inclined scraping plate 33 and flows down from through portion 35. Therefore, according to the present embodiment, a large amount of cutting liquid is returned to storage tank 3, so that the discharge amount of the cutting liquid can be reduced as compared with the chip conveyor of the related art, and thus waste can be suppressed. Moreover, an effect can be obtained by through portion 35 of inclined scraping plate 33 without a complicated structure.

In addition, in chip conveyor 31 of the present embodiment, it is preferable to perform the intermittent operation and the disconnection and connection operation as in the first embodiment. As described above, the effect of the same operation can be obtained, and the discharge amount of the cutting liquid can be further reduced in combination with the configuration of inclined scraping plate 33. These effects can also be obtained by driving control of chip conveyor 31 without a complicated structure.

Figure 7:
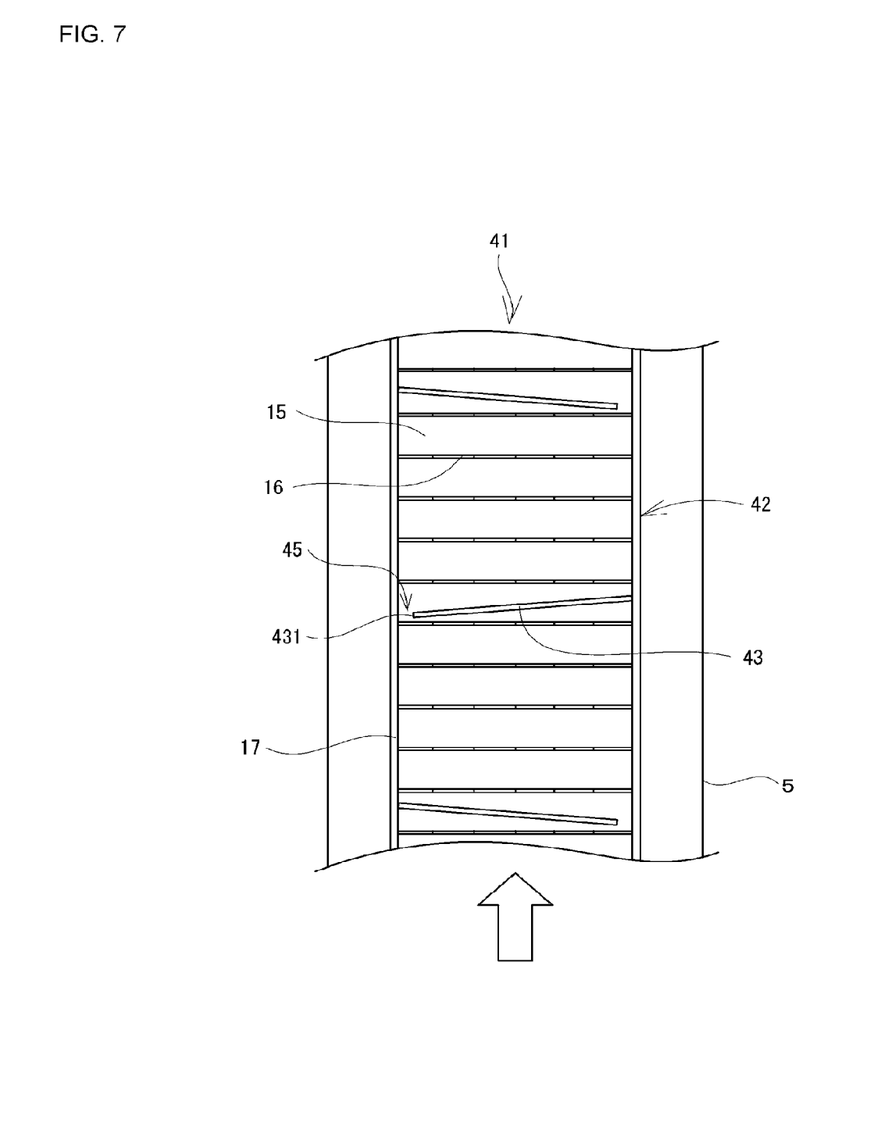
FIG. 7 is a plan view of a third embodiment illustrating the simplified hinge belt in the conveyance duct of the chip conveyor.

Next, a third embodiment of a chip conveyor will be described. FIG. 7 is a plan view illustrating a simplified hinge belt in conveyance duct 5 of the chip conveyor. In chip conveyor 41 of the present embodiment, the configuration other than scraping plate 43 provided on hinge belt 42 is the same as that of chip conveyor 1 of the first embodiment. Therefore, the same reference numerals will be used to describe the common configurations.

In hinge belt 42, multiple hinge plates 15 are circumferentially connected by hinge 16, can circularly move by a driving motor, and scraping plate 43 is joined to hinge plate 15 at a fixed interval. Scraping plate 43 is a rectangular plate material, is joined so as to be orthogonal to hinge plate 15, and also in this embodiment, is inclined in the front-back direction as viewed in the advancing direction. In particular, in the present embodiment, all the scraping plates 43 on hinge belt 42 are inclined in any one direction of the left-right direction, and in a case of being viewed in the advancing direction, the inclined directions are alternately reversed in the left-right direction. An interval is provided between rear end portion 431 and side plate 17 due to the inclination of scraping plate 43 and thus through portion 45 for flowing down the cutting liquid is formed. Scraping plate 43 has an inclined angle at which the chips are supported at the climbing portion, and the size of through portion 45 is not particularly limited and is designed in consideration of the shape and size of the chips.

In chip conveyor 41, chips in storage tank 3 are carried out by the circular moving of hinge belt 42. At that time, the cutting liquid in storage tank 3 passes through through portion 45 of traveling inclined scraping plate 43. In the climbing portion of conveyance duct 5, the chips are supported by scraping plate 43 and rise as hinge belt 10 circularly moves without flowing down. On the other hand, the cutting liquid flows along inclined scraping plate 43 and flows down through through portion 45. In addition, even if the chips fall from through portion 45 toward the rear side in the advancing direction, since the front and rear through portions 45 described above are alternately positioned in the left-right direction, there is no occurrence of chips falling only one side in the left-right direction.

Therefore, according to chip conveyor 41 of the present embodiment, even if scraping plate 43 is provided on hinge belt 42, since the cutting liquid passes through through hole 45 to the rear side in the advancing direction, pumping out of a large amount of cutting liquid from storage tank 3 as in the related art can be avoided. In addition, the cutting liquid remaining at the point of exiting from storage tank 3 flows along inclined scraping plate 43 and flows down from through portion 45. Therefore, according to the present embodiment, a large amount of cutting liquid is returned to storage tank 3, so that the discharge amount of the cutting liquid can be reduced as compared with the chip conveyor of the related art, and thus waste can be suppressed. Moreover, an effect can be obtained by through portion 45 of inclined scraping plate 43 without a complicated structure.

In addition, in chip conveyor 41 of the present embodiment also, it is preferable to perform the intermittent operation and the disconnection and connection operation as in the first embodiment. As described above, the effect of the same operation is obtained, and the discharge amount of the cutting liquid can be further reduced in combination with the configuration of inclined scraping plate 43. These effects are also obtained by driving control of chip conveyor 41 without a complicated structure.

Although embodiments of the present disclosure are described above, the present disclosure is not limited to these embodiments and various modifications are possible without departing from the spirit of the disclosure. In the first and second embodiments, through portions 20 and 35 are formed on the multiple scraping plates 18 and 33 joined to the same hinge plate 15 so as to have an interval in the width direction. Regarding this point, for example, the end portions of the scraping plates 18 or the scraping plates 33 may be disposed so as to be spaced apart from each other in the front-back direction as viewed in the advancing direction of hinge belts 10 and 32, and the interval between the end portions positioned in the front-back direction may also be formed as through portions. In the case, it is conceivable to incline scraping plate 18 of the first embodiment in the same direction as in the third embodiment. In addition, in an embodiment above, although the control using both the intermittent operation illustrated in FIG. 4 and the disconnection and connection operation illustrated in FIG. 5 is illustrated, it is also possible to perform only one of these controls.

REFERENCE SIGNS LIST

1 . . . chip conveyor, 2 . . . chip receiver, 3 . . . storage tank, 5 . . . conveyance duct, 6 . . . discharge duct, 7 . . . driving motor, 8 . . . power supply device 9 . . . control device, 10 . . . hinge belt, 11 . . . driving sprocket, 12 . . . driven sprocket, 13 . . . conveyor chain, 15 . . . hinge plate, 16 . . . hinge, 17 . . . side plate, 18 . . . scraping plate, 20 . . . through portion.

The invention claimed is:

1. A chip conveyor comprising:
a storage tank in which chips and cutting liquid are stored;
an endless conveyor main body which connects both end portions of a number of hinge plates in a front-back direction to each other by a hinge and circularly moves through a climbing portion from an inside of the storage tank by a driving mechanism; and
a control device which controls driving of the driving mechanism,
wherein, in the conveyor main body, multiple scraping plates formed in a standing state with respect to the hinge plate are disposed with an interval in an advancing direction,
wherein the scraping plates are formed along a width direction of the conveyor main body and have one or more through portions through which the cutting liquid passes within the width interval thereof, and
wherein the scraping plates have a substantially rectangular shape and the through portions are slits between the scraping plates that separate the scraping plates in the width direction.

2. The chip conveyor according to claim 1,
wherein the scraping plate is formed to be inclined in the width direction of the conveyor main body and due to the inclination has the through portion formed in the width direction at an end portion positioned on the rear side thereof in the advancing direction.

3. The chip conveyor according to claim 1,
wherein the control device performs a stop operation which stops traveling of the conveyor main body for a fixed time when the chips are supported by the scraping plate and rise the climbing portion, by driving control to the driving mechanism.

4. The chip conveyor according to claim 1,
wherein the control device performs an intermittent operation which repeats driving and stopping or a disconnection and connection operation which repeats driving and reverse driving at a predetermined interval only for a fixed time with respect to traveling of the conveyor main body when the chips are supported by the scraping plate and rise the climbing portion, by driving control to the driving mechanism.

5. A chip conveyor comprising:
a storage tank in which chips and cutting liquid are stored;
an endless conveyor main body which connects both end portions of a number of hinge plates in a front-back direction to each other by a hinge and circularly moves through a climbing portion from an inside of the storage tank by a driving mechanism; and
a control device which controls driving of the driving mechanism,
wherein, in the conveyor main body, multiple scraping plates formed in a standing state with respect to the hinge plate are disposed with an interval in an advancing direction,
wherein the scraping plates are formed along a width direction of the conveyor main body and have one or more through portions through which the cutting liquid passes within the width interval thereof, and
wherein the scraping plate is inclined from both sides in a left-right direction toward the center thereof in the width direction of the conveyor main body, and the through portion is formed in a central portion thereof.

6. A chip conveyor comprising:
a storage tank in which chips and cutting liquid are stored;
an endless conveyor main body which connects both end portions of a number of hinge plates in a front-back direction to each other by a hinge and circularly moves through a climbing portion from an inside of the storage tank by a driving mechanism; and
a control device which controls driving of the driving mechanism,
wherein, in the conveyor main body, multiple scraping plates formed in a standing state with respect to the hinge plate are disposed with an interval in an advancing direction,
wherein the scraping plates are formed along a width direction of the conveyor main body and have one or more through portions through which the cutting liquid passes within the width interval thereof, and
wherein the scraping plate is inclined to one side of the conveyor main body in the width direction and the inclined directions of the multiple scraping plates arranged in the advancing direction of the conveyor main body are constant or different from each other.

* * * * *